United States Patent Office 3,699,120
Patented Oct. 17, 1972

3,699,120
METHOD OF PRODUCING INDOLE
Jan Magnus Bakke and Harald Erik Heikman, Karlskoga, Sweden, assignors to Aktiebolaget Bofors, Bofors, Sweden
No Drawing. Filed Oct. 28, 1970, Ser. No. 84,881
Claims priority, application Sweden, Oct. 30, 1969, 14,902/69
Int. Cl. C07d 27/56
U.S. Cl. 260—319.1                    11 Claims

ABSTRACT OF THE DISCLOSURE

Indole is produced in high yields in one single stage by contacting gaseous 2-(o-nitrophenyl)-ethanol together with a reducing gas or a mixture of reducing gas and inert gas over a hydrogenation catalyst heated to a temperature of about 200 to 400° C.

DESCRIPTION OF THE INVENTION

The present invention relates to a method of producing indole in high yields and with a high degree of purity under economically advantageous conditions.

Indole has been produced by a number of processes which, inter alia, are described by R. C. Elderfield in Heterocyclic Compounds, vol. 3, John Wiley and Sons, Inc., New York. The majority of these processes are multistage processes, which result in an expensive product.

Indole has also been produced, however, by singlestage processes using relatively inexpensive starting materials. For example, o-aminoethylbenzene has been converted to indole at an elevated temperature of the order of 600° C. by cyclization and dehydrogenation. The indole yield afforded by this process, however, is poor and the resultant product is strongly contaminated with secondary products, which necessitates the application of costly purification processes.

It has now been discovered that indole can be obtained in high yield and with a high degree of purity in one single reaction stage if 2 - (o - nitrophenyl) - ethanol (ONFE) in the gaseous phase is passed together with a reducing gas, or a mixture of a reducing gas and an inert gas, over a heated catalyst.

The catalyst may be supported on a suitable carrier, for example, aluminum oxide or silica gel. The carrier can also contain a salt such as potassium sulphate.

Conventional hydrogenation catalyst can be used as the catalyst in the method of the present invention. Suitable hydrogenation catalysts include copper, nickel, cobalt, palladium, copper chromite, vanadium pentoxide and the like.

The reducing gas may be hydrogen gas or ammonia, for example, optionally in mixture with nitrogen gas.

Although the reaction temperature is not critical, a convenient reaction temperature is one between 200–400° C., preferably between 250–300° C.

Moreover, the ratio of ONFE to reducing gas is also not of critical importance, although for the purpose of obtaining a good result a mole ratio between ONFE and reducing gas of between 1:3 and 1:20 is suitably used.

The invention will now be illustrated by a number of examples.

EXAMPLES 1–19

In all examples ONFE was vaporized (5.6 gr./hr.) and contacted with a reducing gas over 30 ml. of catalyst in a reactor. The gaseous mixture leaving the reactor was analyzed in a gas chromatograph. The results are recorded in the table given below. The recorded percentage of indole is the area of the indole peaks in the gas chromatogram as the percentage of the total area in the gas-chromatogram and discloses the degree of purity of the indole in percent of organic substance.

The reactor consists of a tube made of quartz glass, 56 cm. long, and with an inner diameter of 15 mm. A thermocouple well with an outer diameter of 8 mm. is centered all through the tube. The tube is filled up to 28 cm. height with the catalyst and the remaining 28 cm. section is filled up with quartz glass chips. However, there is one exception: in Ex. 14 the reactor length is 28 cm., and the catalyst and quartz glass chips sections are each 14 cm.

TABLE

| Ex. | Temp., °C. | Catalyst | Ml. reducing gas or gas mixture per min. | Reducing gas or gas mixture | Indole, percent | Contact time (sec.) | Mole ratio ONFE/red. gas (—mixture) |
|---|---|---|---|---|---|---|---|
| 1 | 300 | 14% Cu/Al$_2$O$_3$[a] | 80 | H$_2$ | 97 | 14 | 1/6 |
| 2 | 250 | 7% Cu/Al$_2$O$_3$ | 80 | H$_2$ | 98 | 14 | 1/6 |
| 3 | 250 | 14% Cu/Al$_2$O$_3$ | 80 | H$_2$ | 98.5 | 14 | 1/6 |
| 4 | 250 | 70% Cu/Al$_2$O$_3$ | 80 | H$_2$ | 94 | 14 | 1/6 |
| 5 | 250 | 3.5% Cu/Al$_2$O$_3$ | 80 | H$_2$ | 78 | 14 | 1/6 |
| 6 | 250 | 7% Cu/silica gel | 240 | H$_2$ | 98 | 5 | 1/18 |
| 7 | 250 | ...do... | 160 | H$_2$ | 99 | 7 | 1/12 |
| 8 | 250 | ...do... | 40 | H$_2$ | 70 | 24 | 1/3 |
| 9 | 330 | ...do... | 160 | H$_2$ | 66 | 7 | 1/12 |
| 10 | 400 | ...do... | 160 | H$_2$ | 26 | 7 | 1/12 |
| 11 | 250 | 7% Ni/Al$_2$O$_3$ | 160 | H$_2$ | 42 | 7 | 1/12 |
| 12 | 250 | 7% Ni/silica gel | 160 | H$_2$ | 59 | 7 | 1/12 |
| 13 | 250 | 7% Co/silica gel | 160 | H$_2$ | 78 | 7 | 1/12 |
| 14 | 250 | 0.5% Pd/Al$_2$O$_3$ | 40 | H$_2$ | 66 | 13 | 1/3 |
| 15 | 250 | Cu | 160 | H$_2$ | 95 | 7 | 1/12 |
| 16 | 250 | V$_2$O$_5$/K$_2$SO$_4$·SiO$_2$[b] | 160 | H$_2$ | 85 | 7 | 1/12 |
| 17 | 250 | V$_2$O$_5$/K$_2$SO$_4$·SiO$_2$[b] | 160 | NH$_3$ | 84 | 7 | 1/12 |
| 18 | 250 | 7% Cu/silica gel | 160 | H$_2$:N$_2$, 1:1 | 97 | 7 | 1/12 |
| 19 | 250 | Copper chromite | 160 | H$_2$ | 90 | 7 | 1/12 |

[a] Percentage refers to weight percent hydrogenation component in total catalyst, e.g., 14 weight percent Cu, 86 weight percent Al$_2$O$_3$.
[b] V$_2$O$_5$ (weight percent): 9, K$_2$SO$_4$ (weight percent): 20, SO$_3$ (weight percent): 11, SiO$_2$ (weight percent): 60.

We claim:

1. A method of preparing indole comprising passing 2-(o-nitrophenyl)-ethanol with a reducing gas or a mixture of reducing gas and inert gas over a heated hydrogenation catalyst, the temperature of the catalyst being between 200 to 400° C.

2. The method of claim 1, in which the catalyst is copper.

3. The method of claim 1, in which the catalyst is nickel.

4. The method of claim 1, in which the catalyst is cobalt.

5. The method of claim 1, in which the catalyst is palladium.

6. The method of claim 1, in which the catalyst is copper chromite.

7. The method of claim 1, in which the catalyst is supported on a carrier of a material selected from the group aluminumoxide and silica gel.

8. The method of claim 1, in which the catalyst is maintained at a temperature of between 250 and 300° C.

9. The method of claim 1 in which the 2-(o-nitrophenyl)-ethanol and reducing gas are present in a molar ratio of between 1:3 and 1:20.

10. The method of claim 1 wherein the 2-(o-nitrophenyl)-ethanol is gaseous 2-(o-nitrophenyl)-ethanol.

11. The method of claim 1 wherein the reducing gas is selected from the group consisting of hydrogen, ammonia, and mixtures of hydrogen or ammonia with an inert gas.

References Cited

Sundberg: The Chemistry of Indoles (1970), pp. 176–79.

ALEX MAZEL, Primary Examiner

J. A. NARCAVAGE, Assistant Examiner